United States Patent
Ghessassi

(10) Patent No.: US 9,477,886 B2
(45) Date of Patent: Oct. 25, 2016

(54) SMART DOCUMENT ANCHOR

(71) Applicant: Digitech Systems Private Reserve, LLC, Greenwood Village, CO (US)

(72) Inventor: Karim Ghessassi, Parker, CO (US)

(73) Assignee: Digitech Systems Private Reserves, LLC, Greenwood Village, CO (US)

(*) Notice: Subject to any disclaimer, the term of this patent is extended or adjusted under 35 U.S.C. 154(b) by 211 days.

(21) Appl. No.: 14/194,212

(22) Filed: Feb. 28, 2014

(65) Prior Publication Data

US 2014/0281910 A1    Sep. 18, 2014

Related U.S. Application Data

(60) Provisional application No. 61/782,842, filed on Mar. 14, 2013, provisional application No. 61/782,968, filed on Mar. 14, 2013, provisional application No. 61/783,012, filed on Mar. 14, 2013, provisional application No. 61/783,045, filed on Mar. 14, 2013, provisional application No. 61/782,893, filed on Mar. 14, 2013.

(51) Int. Cl.
| | |
|---|---|
| G06K 9/00 | (2006.01) |
| G06F 17/30 | (2006.01) |
| G06F 17/24 | (2006.01) |

(52) U.S. Cl.
CPC ......... G06K 9/00483 (2013.01); G06F 17/248 (2013.01); G06F 17/30011 (2013.01); G06F 17/30598 (2013.01)

(58) Field of Classification Search
CPC ............ G06K 9/00483; G06F 17/248; G06F 17/30011; G06F 17/30598
See application file for complete search history.

(56) References Cited

U.S. PATENT DOCUMENTS

| | | | |
|---|---|---|---|
| 6,609,200 B2 | 8/2003 | Anderson et al. | |
| 6,778,703 B1* | 8/2004 | Zlotnick ............ | G06K 9/00449 382/218 |
| 7,287,219 B1 | 10/2007 | Young et al. | |
| 7,925,551 B2 | 4/2011 | Hahn-Carlson et al. | |
| 2007/0047782 A1* | 3/2007 | Hull .................... | G06K 9/00442 382/124 |
| 2009/0265363 A1* | 10/2009 | Lai .......................... | G06Q 10/10 |
| 2011/0243477 A1* | 10/2011 | Minerich ............. | G06K 9/3275 382/294 |
| 2011/0320934 A1* | 12/2011 | Sayers .............. | G06F 17/30011 715/255 |

* cited by examiner

*Primary Examiner* — Kyle Stork
(74) *Attorney, Agent, or Firm* — Sheridan Ross P.C.

(57) ABSTRACT

A template document is received. A user defines an anchor area, and a field zone that contains a target object, in the template document. Objects, such as text objects, are identified in the anchor area along with their locations. Distances between locations of the objects in the anchor area are identified. A distance between the anchor area and the field zone is identified. A reference document is received. The objects in the reference document are identified. A number of common objects are identified. If there are common objects, locations of the common objects and the distances between the common objects are identified in the reference document. The identified distances between objects in the template document and the reference document are compared. If the distances are substantially the same, a corresponding target object is retrieved from the reference document based on the distance between the anchor area and the field zone.

20 Claims, 7 Drawing Sheets

SMART DOCUMENT ANCHOR

CROSS REFERENCE TO RELATED APPLICATIONS

This application claims the benefit under 35 U.S.C. §119 (e) of U.S. Provisional Application No. 61/782,842, filed Mar. 14, 2013, entitled "PAGE ALIGNMENT AND CORRECTION," U.S. Provisional Application No. 61/782,968 entitled "PAGE CLASSIFICATION," filed Mar. 14, 2013, U.S. Provisional Application No. 61/783,012 entitled "PAGE CLUSTERING," filed Mar. 14, 2013, U.S. Provisional Application No. 61/783,045 entitled "PAGE RECONSTRUCTION" filed Mar. 14, 2013, and U.S. Provisional Application No. 61/782,893 entitled "SMART ANCHOR" filed Mar. 14, 2013, the entire disclosures of all of which are incorporated herein by reference.

TECHNICAL FIELD

The systems and methods disclosed herein relate to document management systems and in particular to document management systems that identify objects in documents.

BACKGROUND

Today, there is an increased need to be able to capture specific information from documents. For example, a company may want to capture a total invoice value from a group of invoices in order to automate the payment process. Existing systems are able to capture specific information from a document based on defining a specific location in the document to look for the information. For example, a value of a check can be determined by capturing a specific field from a check, such as the amount field. These types of systems work as long as the location of the field is always at the same position in the document. However, this can be problematic when a document becomes misaligned, scanned at a different resolution, or scanned upside down. In addition, in some documents, the area associated with the field may not be in the same location or even the same page due to variations in the documents, such as long lists of purchased items in an invoice. Since the specific information is no longer at the same location, existing solutions capture invalid information in these situations. What is needed is a better way to identify specific information in documents to improve overall accuracy.

SUMMARY

Systems and methods are provided to solve these and other problems and disadvantages of the prior art. A template document is received. The template document is a document that is used to cluster documents into categories. For example, a company may use the template document identify invoices or contracts from a specific vendor out of a group of invoices and/or contracts from multiple vendors. A user defines an anchor area (e.g., an area that contains text around an invoice total), and a field zone that contains a target object (e.g., the total amount in an invoice), in the template document. Objects, such as text objects, are identified in the anchor area along with their locations. Distances between locations of the objects in the anchor area are identified. A distance between the anchor area and the field zone is identified. A reference document is received. The objects in the reference document are identified. A number of common objects are identified and the locations of the common objects and the distances between the common objects are identified in the reference document. The identified distances between template document and the reference document are compared. If the distances are substantially the same, a corresponding target object is identified and retrieved from a corresponding field zone from the reference document based on the distance between the anchor area and the field zone.

DETAILED DESCRIPTION

Figure 1:
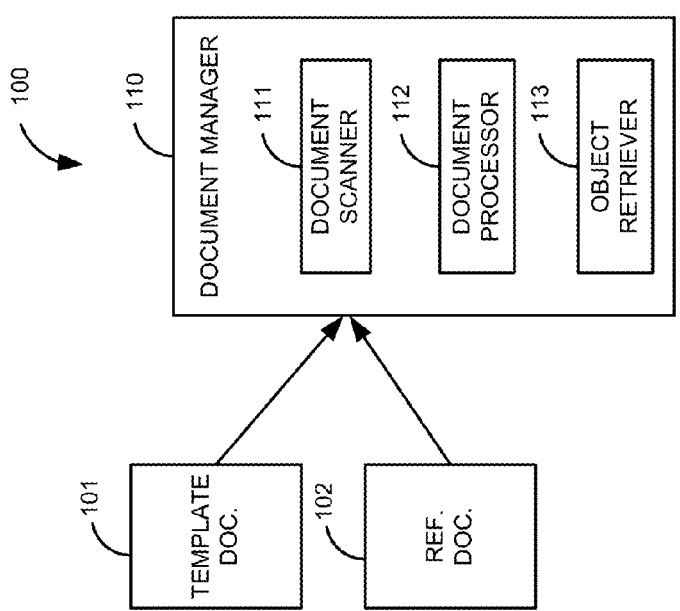
FIG. 1 is a block diagram of a first illustrative system for capturing information from documents.

FIG. 1 is a block diagram of a first illustrative system 100 for capturing information from documents (101 and 102). The first illustrative system 100 comprises a document manager 110. The document manager 110 can be any hardware/software that can be used to manage documents, such as a scanner, a multifunction peripheral, a fax machine, a network based software application, and/or the like.

The document manager 110 comprises a document scanner 111, a document processor 112, and an object retriever 113. The document scanner 111 can be any hardware/software that can be used to scan documents, such as a scanner, a network scanner, a fax machine, a multifunction peripheral, and/or the like. The document processor 112 can be any hardware/software that can process and manage documents. The object retriever 113 can be any hardware/software that can be used to retrieve information from documents.

FIG. 1 also includes a template document 101 and a reference document 102. The template document 101 is a document that is used to identify other documents that are similar, such as the reference document 102. For example, the template document 101 may be an invoice document from a specific vendor that used to identifying similar types of documents (reference documents 102) from the same vendor. The identification of similar documents allows for capturing of specific information from the reference documents in common locations, such as a total in an invoice. The template document 101 and/or the reference document 102 may be physical documents that are scanned in by the document scanner 111. The template document 101 and/or the reference document 102 may be generated by a device, such as a camera. The template document 101 and/or the reference document 102 can be generated directly by a program, such as a word processing program, a spreadsheet, a presentation program, a graphical program, a picture management program, and/or the like. The template document 101 and/or the reference document 102 can be in various forms, such as a Tagged Image File Format (TIFF) file, a Portable Document Format (PDF), a Rich Text Format (RTF), an Extended Markup Language (XML) document, a Hyper Text Markup Language (HTML) document/web page, a Graphics Interchange Format (GIF) file, and/or the like.

The document processor 112 receives the template document 101. The template document 101 can be received from various sources, such as the document scanner 111, a network scanner, a networked device, a database, a camera, and/or the like. The template document 101 can include a variety of objects. For example, objects in the document (the template document 101 and the reference document 102) can include a text object, a picture object, an icon object, a graphic object, a logo object, a number, a symbol, a table, a graphical element, metadata in the template document 101/ reference document 102, and/or the like. A text object may include a single letter, a word, a sentence, a paragraph, a heading, a page, a phrase, a footer, a header, a name, a marked change text, and/or the like. An object may comprise multiple objects. For instance, a picture may comprise multiple objects such as a car, a person, a building, and/or the like. A text object such as a sentence may comprise multiple text objects. Objects can be predefined. For example, objects can include specific words or phrases.

Figure 3:
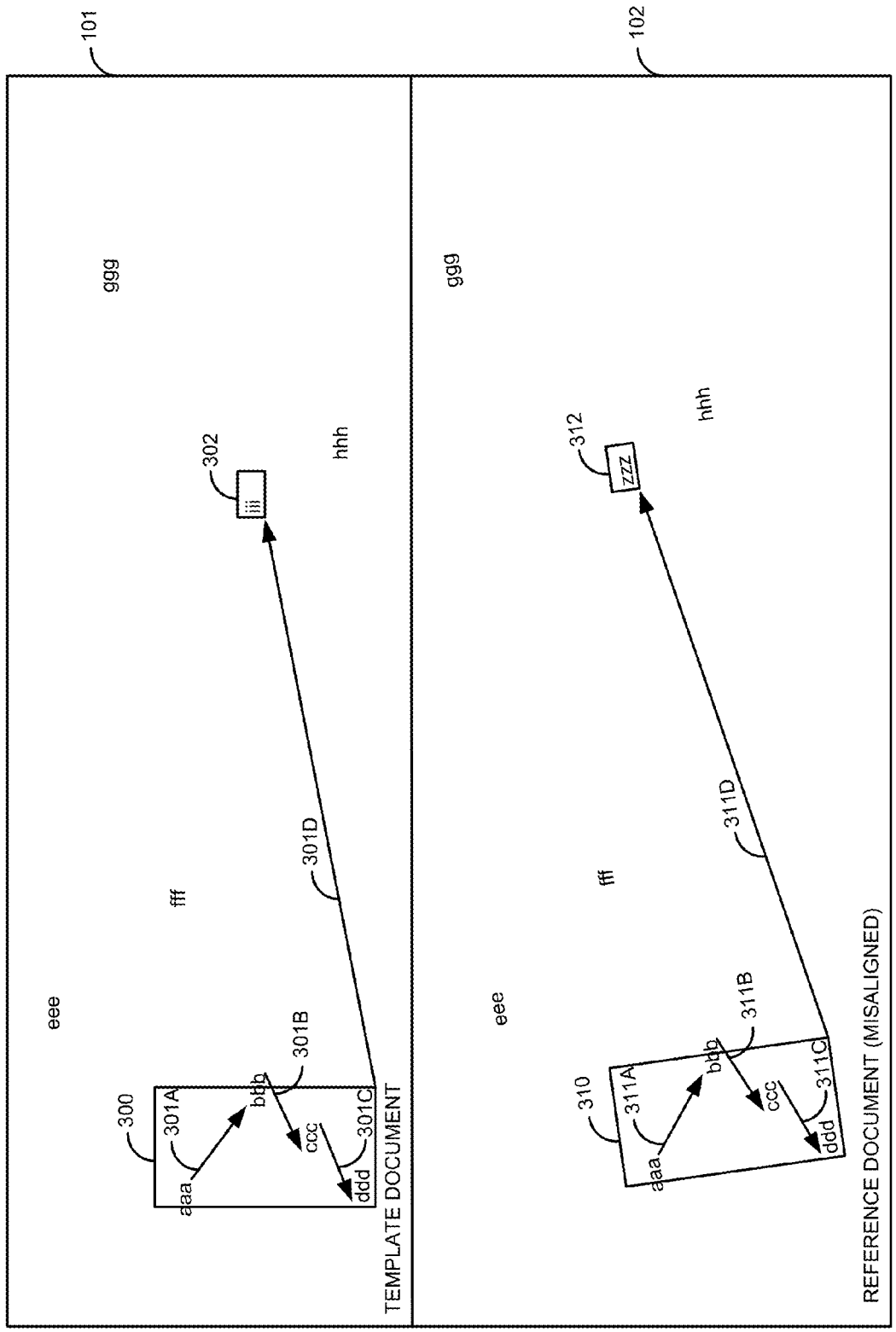
FIG. 3 is a diagram of how distances between objects in an anchor area of a document are used to group documents.

Referring to FIG. 3, the template document 101 includes text objects aaa-iii. The document processor 112 receives an input that identifies an anchor area 300 in the template document 101. In this example, the anchor area 300 is an area defined in the template document 101 by a user using a mouse or touch screen on the scanner 111 (or via a personal computer). In other embodiments, the input may be provided from other sources. In FIG. 3, the anchor area 300 is defined as a rectangle. However, in other embodiments, the anchor area 300 can be defined based on a square, a circle, an oval, a user drawn area, a triangle, a combination of these, and the like. In one embodiment, multiple anchor areas 300 can be defined in the template document 101.

The anchor area 300 comprises a plurality of objects. In FIG. 3, the anchor area 300 contain text objects aaa, bbb, ccc, and ddd. The text objects aaa and bbb are partially in the anchor area 300. In this embodiment, the text objects aaa and bbb are included as being in the anchor area 300. In alternative embodiments, the text objects that are partially within the anchor area 300 are considered to not be included within the anchor area 300. In still other embodiments, only the portions of a text object (e.g., the letters of a word) that are within the anchor area 300 are included as objects within the anchor area 300.

The document processor 112 identifies the objects in the anchor area 300 (aaa-ddd) of the template document 101. The document processor 112 identifies the locations of the objects in the anchor area 300 of the template document 101. The document processor 112 identifies one or more distances between the locations of the plurality of objects within the anchor area 300. For example, referring to FIG. 3, the document processor 112 identifies the objects aaa-ddd based on a grid location within the anchor area 300 of the template document 101. The document processor 112 identifies the distances 301A-301C in the template document 101. The process of locating objects between documents, determining distances between objects, determining relative angles between objects is further described in patent application Ser. No. 14/174,674 entitled "SYSTEM AND METHOD FOR DOCUMENT ALIGNMENT, CORREC- TION, AND CLASSIFICATION," which was filed on Feb. 5, 2014 and is incorporated herein by reference in its entirety.

In addition, distances may be determined by using a character, word and/or line distance of a document. This can be useful for documents that are semi-formatted documents such as Hyper Text Markup Language (HTML) documents where the spacing between the characters and lines is consistent. In this embodiment, the distance is calculated based on a number of characters, words, and/or lines that are between the two objects. For example, if one of the objects was on line 1 two characters in and the second objects was on line 2, 4 characters in. The system could calculate the distance based on the two objects being one line apart and 2 characters in.

The document processor 112 receives an identified field zone 302 in the template document 101. The field zone 302 is an area defined by a user in a similar manner as described for the anchor area 300. The field zone 302 in the template document 101 includes a target object (text object iii in this example). The target object is typically a field that a user wants identified and retrieved from the reference document 102. For example, if the template document 101 and the reference document 102 are invoice documents from a company, the anchor area 300 may be an area associated with items included in a total amount on the invoice. The field zone 302 may be an area that contains the total amount for the invoice (e.g., see FIG. 7 as an illustrative example). The total amount of the invoice is identified and retrieved in order to process the invoice. In this example, the target object only comprises a single object. However, in other embodiments, the target object may comprise multiple objects.

The document processor 112 identifies a distance 301D between the anchor area 300 and the field zone 302 in the template document 101. In the example in FIG. 3, the distance 301D between the anchor area 300 and the field zone 302 is defined from the lower right hand corner of the anchor area 300 to the lower left hand corner of the field zone 302. The distance 301D can be based on any orientation point associated with the anchor area 300 and the field zone 302. For example, the document processor 112 may use a center point associated with the anchor area 300 and the field zone 302 to calculate the distance 301D. Alternatively, if the field zone 302 was to the left of the anchor area 300, the document processor 112 may use the upper left hand corner of the anchor area 300 and the upper right hand corner of the field zone 302. The orientation points used by the document processor 112 can dynamically change based the orientation between the anchor area 300 and the field zone 302. The orientation point of an object may be outside the anchor area 300. For example, as shown in FIG. 3, the orientation point for the text object bbb is actually outside the anchor area 300.

In an embodiment, the user can define multiple field zones 302. When multiple field zones 302 are identified, the document processor 112 identifies the distances 301D between the anchor area 300 and the field zones 302 as described previously. The document processor 112 may use the same orientation points or a different orientation points for the anchor area 300 and each the field zones 302. For example, the anchor area 300 may have two different orientation points, one to each of the field zones 302.

The document processor 112 receives the reference document 102. The reference document 102 can be received in any manner as described above for the template document 101. The reference document 102 comprises multiple objects (e.g., text objects aaa-hhh and zzz as shown in FIG. 3). The document processor 112 identifies the text objects (aaa-hhh and zzz) in the reference document 102. The document processor 112 determines that at least a number of the objects (aaa-ddd) in the anchor area 300 are common to the objects aaa-iii and zzz in the reference document 102.

In response to a number of objects being common between the anchor area 300 in the template document 101 and the objects in the reference document 102, the document processor 112 identifies the locations of common objects (aaa-ddd) in the reference document 102. In one embodiment, this can also be also based on relative locations. The document processor 112 identifies the distances (e.g., distances 311A, 311B, and 311C) between the locations of the common objects (aaa-ddd) in the reference document 102.

The document processor 112 determines that the distances 301A-301C between the locations of the objects (aaa-ddd) in the anchor area 300 of the template document 101 are substantially the same as the distances 311A-311C in the reference document 102. In one embodiment, this can also be based on relative locations. In response to determining that the distances 301A-301C are substantially the same as the distances 311A-311C, the object retriever 113 identifies and retrieves a corresponding target object 312 from a corresponding target zone in the reference document 102 (zzz) based on the distance 301D between the anchor area 300 and the corresponding field zone 312 in the reference document 102. The object retriever 113 can determine a corresponding anchor area 300 in the reference document 102 based the locations of the objects aaa-ddd at common locations that are in the reference document 102. If multiple field zones 302 have been defined, the object retriever 112 can retrieve the multiple field zones 302 in the same manner as a described for single field zone 302.

In this example, even though the reference document 102 is misaligned, the distances 301A-301D in the template document 101 are still substantially the same as the distances 311A-311D in the reference document 102. Likewise, if the reference document 102 was scanned upside down, the distances 301A-301D in the template document 101 will still be substantially the same as the distances 311A-311D in the reference document 102. In one embodiment, if the reference document 102 was scanned using a different resolution, the document processor 112 can determine that the distances 301A-301D in the reference document 102 are substantially the same based on a relative distance of the distances 311A-311D in the reference document 102.

The above process will work for a template document 101 and a reference document 102 that contain the same objects both in the anchor area 300 and outside the anchor area 300. For example, if the reference document 101 also contained the text objects aaa and bbb outside the anchor area 300 as well as inside the anchor area 300, the document processor 112 can determine that the distances between the objects aaa and bbb that are outside the anchor area 300 are not the same as those for the same objects aaa and bbb that are within the anchor area 300. The document processor can also use relative locations to sort out unwanted objects that are outside the anchor area 300.

Figure 4:
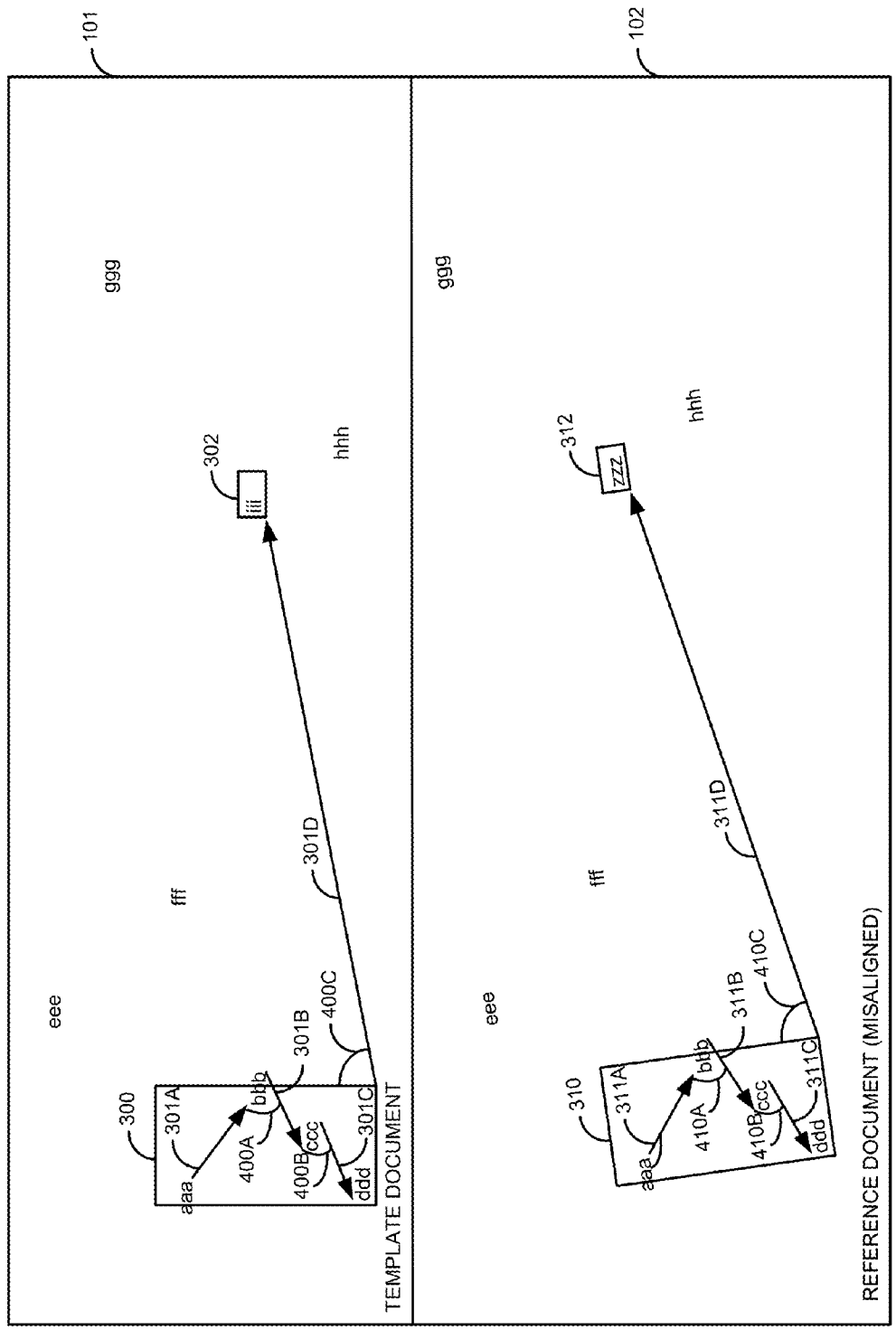
FIG. 4 is a diagram of how distances and relative angles between objects in an anchor area of a document are used to group documents.

The above process can be implemented based on relative angles between objects in conjunction with the distances between objects. The document processor 112 identifies one or more relative angles between the objects in the anchor area 300. The relative angles are based on an orientation of the respective objects in the anchor area 300. For example, as shown in FIG. 4, the document processor 112 can identify the relative angles 400A-400B in the anchor area 300.

The document processor 112 can identify the relative angles 410A-410B for the common objects aaa-ddd in the reference document 102. The relative angles are identified based on the orientation of the reference document 102. Because the relative angles 410A-410B are based on the orientation of the reference document 102 (which is misaligned), the relative angles 410A-410B in the reference document 102 are substantially the same as the relative angles 400A-400B in the template document 101 in spite of the reference document 102 being misaligned.

Based on the relative angles 400A-400B in the template document 101 being substantially the same as the relative angles 410A-410B in the reference document 102, the corresponding target object (zzz) is retrieved from the corresponding target zone 312 in the reference document 102. The use of relative angles 400 can be used in conjunction with the distances 301 to provide greater accuracy in identifying objects. Alternatively, the first illustrative system 100 can use only relative angles 400 for determining if the objects are common objects (and not rely on the distances 301).

The above processes are discussed based on a document being a single page. However, in other embodiments, the anchor area 300 and the field zone 302 may be defined across multiple pages within the template document 101. The processes described herein describe systems and methods being implemented for documents. However, the methods and systems may also be implemented based on a number of pages, paragraphs, pictures, and/or the like.

Figure 2:
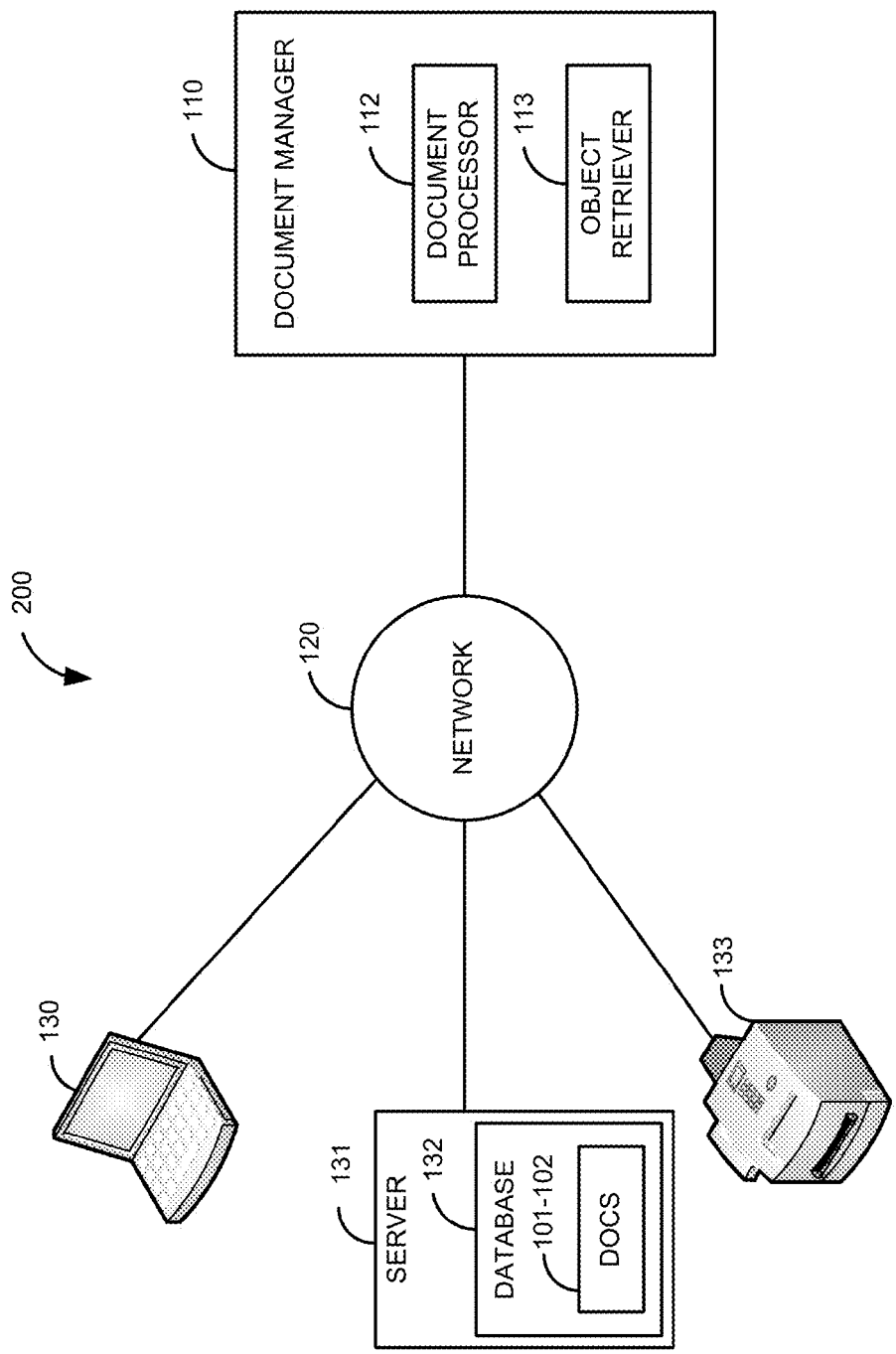
FIG. 2 is a block diagram of a second illustrative system for capturing information from documents.

FIG. 2 is a block diagram of a second illustrative system 200 for capturing information from documents. The second illustrative system 200 is an illustration of the system of FIG. 1 in a networked environment. The second illustrative system 200 comprises a computer 130, a server 131, a network scanner 133, a network 120, and the document manager 110.

The computer 130 can be any computing device, such as a personal computer, a Personal Digital Assistant (PDA), a telephone, a smart telephone, a laptop computer, a tablet computer, and/or the like. The server 131 can be any hardware/software that can manage documents 101/102, such as a file server, a database server, a web server, and/or the like. The server 131 further comprises a database 132. The database 132 can be any type of database, such as relational database, an object oriented database, a directory service, a file system, and/or the like. The database 132 comprises the template document 101 and the reference document 102. In this illustrative embodiment, the document manager 110 only comprises the document processor 112 and the object retriever 113.

The document manager 110 is connected to a network 120. The network 120 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 120 can use a variety of protocols, such as Ethernet, Internet Protocol (IP), 802.11G, Simple Network Management Protocol (SNMP), and the like.

The document processor 112 can receive documents from the devices 130, 131, and 132 on the network 110. For example, a user at computer 130 could create the template document 101 or fill out a reference document 102 that is either sent directly to the document processor 112 or stored in the database 132. A user at computer 130 could fill out an invoice using template 101 and send it to a company for processing. The invoice (102) could then be stored in the database 132 for processing by the document processor as described in FIG. 1.

Alternatively, the network scanner 133 could be used to scan the template document 101 and/or the reference document 102 for storage in the database 132. The scanned documents 101/102 could be sent directly to the document processor 112 from the network scanner 133.

In another embodiment, the document processor 112 can periodically retrieve reference documents 102 from the file server 131 via the database 132 for processing. This way, invoices/contracts can be processed based on pay periods or other time periods.

Figure 5:
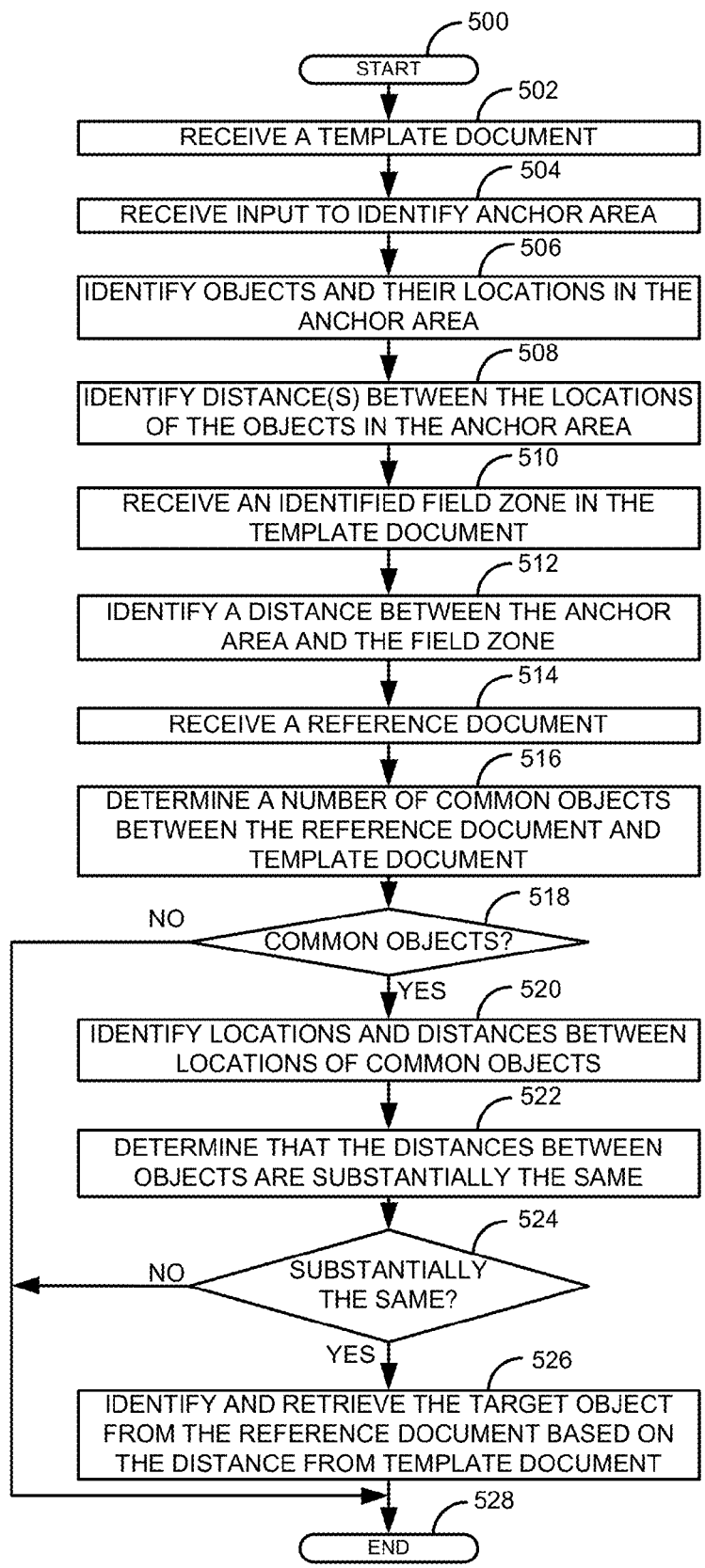
FIG. 5 is a flow diagram of a process for capturing information from documents using distances between common objects in the documents.
Figure 6:
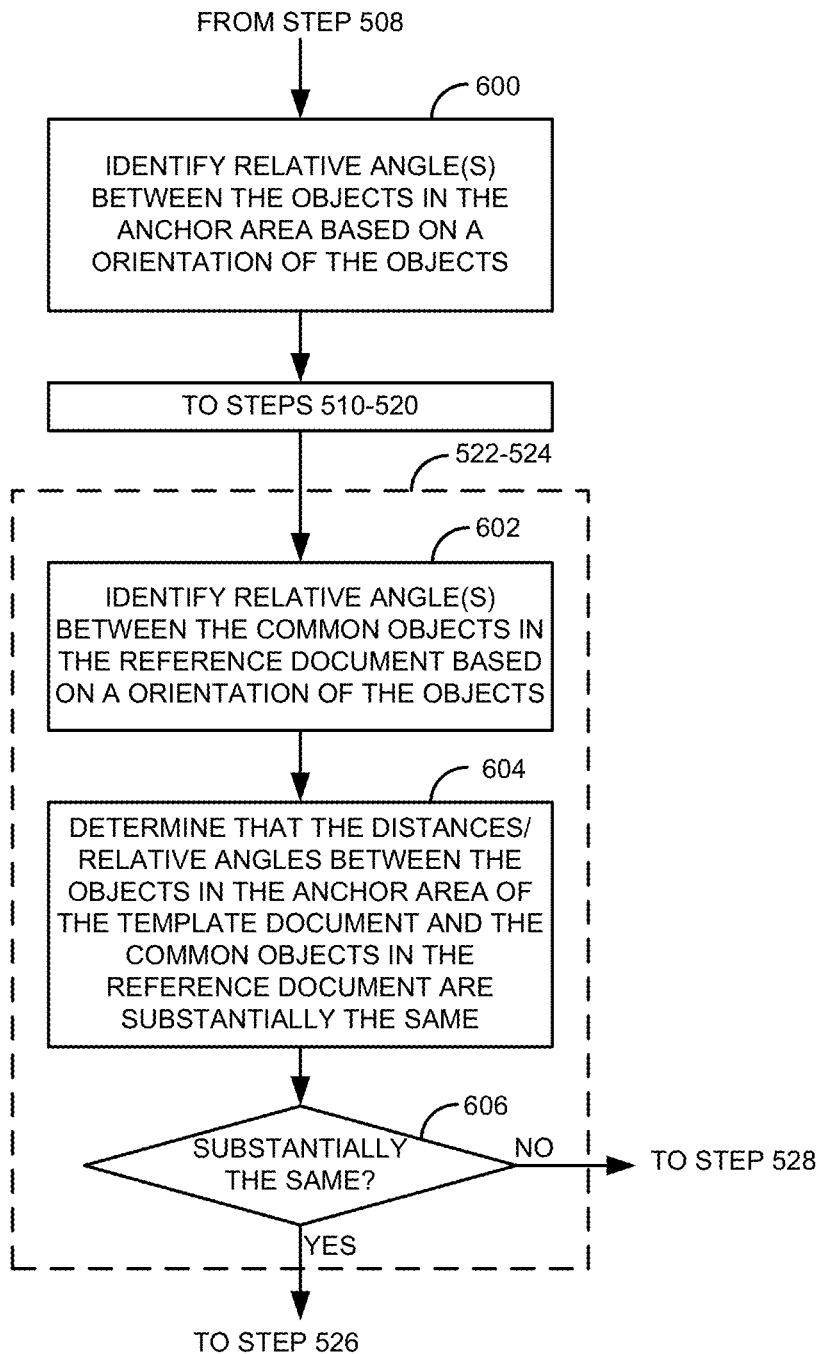
FIG. 6 is a flow diagram of a process for capturing information from documents using distances and relative angles between common objects in the documents.

FIG. 5 is a flow diagram of a process for capturing information from documents using distances between common objects in the documents. Illustratively, the document manager 110, the document scanner 111, the document processor 112, the object retriever 113, the computer 130, the server 131, and the network scanner 133 are stored-program-controlled entities, such as a computer or processor, which performs the method of FIGS. 5-6 and the processes described herein by executing program instructions stored in a tangible computer readable storage medium, such as a memory or disk. Although the methods described in FIGS. 5-6 are shown in a specific order, one of skill in the art would recognize that the steps in FIGS. 5-6 may be implemented in different orders and/or be implemented in a multi-threaded environment. Moreover, various steps may be omitted or added based on implementation.

The process starts in step 500. A template document is received in step 502. An input is received that identifies an anchor area in step 504 in the template document. Objects are identified along with their respective locations in the anchor area of the template document in step 506. The process identifies a distance between the locations of the objects in the anchor area in the template document in step 508. The process receives an identified field zone in the template document in step 510. The field zone includes a target object. The distance between the anchor area and the field zone in the template document is identified in step 512.

The process receives a reference document in step 514. The process determines a number of common objects between the reference document and the template document in step 516. If there are no common objects in step 518, the process goes to step 528 and ends in step 528. Otherwise, if there are common objects in step 518, the process identifies locations and distances between the common objects in the reference document in step 520. In one embodiment, the determined number of common objects is based on the objects being in a common location. However, in other embodiments, the objects in the reference document may only be identified based if the objects are common.

The process determines, in step 522, if the distances between the objects in the anchor area of the template document are substantially the same as the distances between the common objects in the reference document. If the distances are not substantially the same in step 524, the process ends in step 528. Otherwise, if the distances are substantially the same in step 524, the process retrieves the corresponding target object in the corresponding field zone in the reference document based on the distance from the anchor area to the field zone in the template document in step 526. The process then ends in step 528.

FIG. 6 is a flow diagram of a process for capturing information from documents using distances and relative angles between common objects in the documents. The process of FIG. 6 begins after step 508 in FIG. 5. After identifying the distances between the locations of the objects in the anchor area of the template document in step 508, the process identifies relative angle(s) between the objects in the anchor area in the template document based on an orientation of the objects in step 600. The process performs steps 510-520 as described previously in FIG. 5. The process identifies the relative angle(s) between the common objects in the reference document based on an orientation of the objects in the reference document in step 602.

The process determines in step 604 if the distances and relative angles between the objects in the anchor area of the template document and the distances and relative angles between the common objects in the reference document are substantially the same. If the distances and relative angles are substantially the same in step 606, the process goes to step 526. Otherwise, if the distances and relative angles are not substantially the same, the process goes to step 528. In this example, both distances and relative angles are required. However, in other embodiments, only relative angles or only distances may be used.

Figure 7:
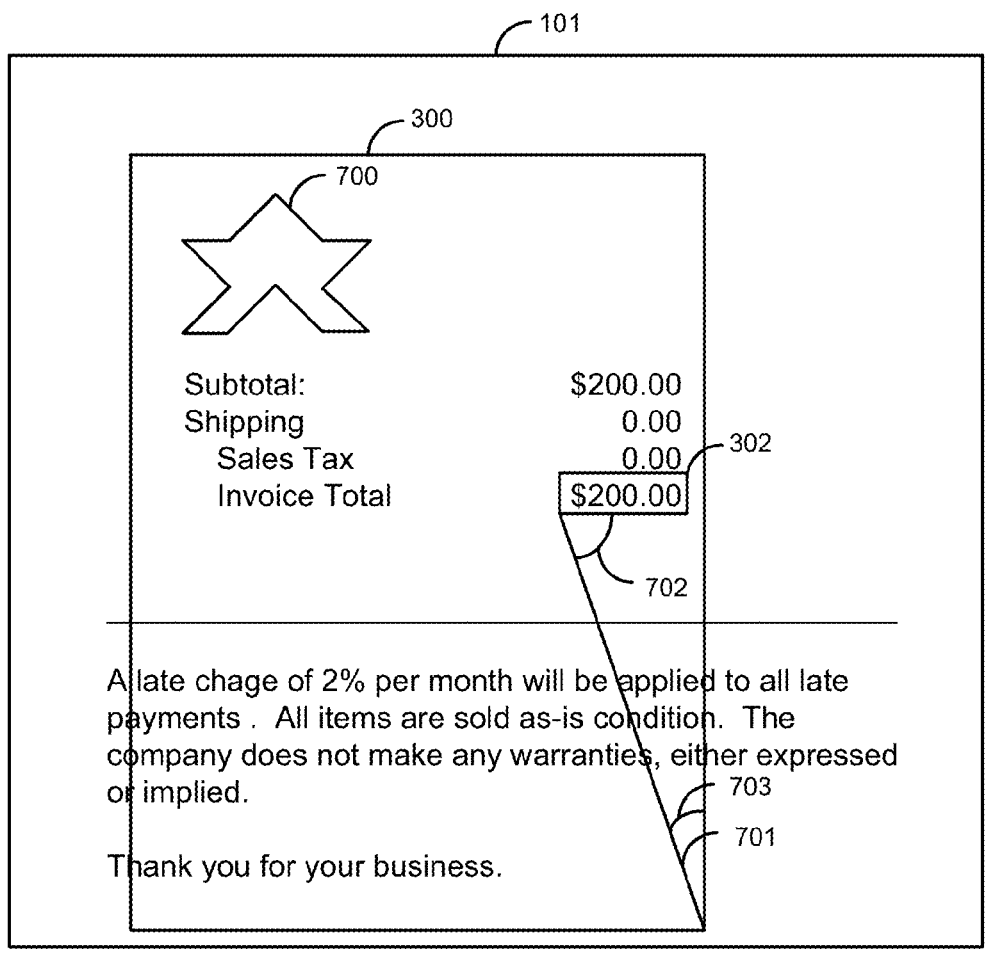
FIG. 7 is an exemplary diagram of an anchor area and an associated field zone that is within the anchor area.

FIG. 7 is an exemplary diagram of an anchor area 300 and an associated field zone 302 that is within the anchor area 300. FIG. 7 is an exemplary template document 101. In this example, a user has selected an anchor area 300 and a field zone 302 in a similar manner as described above. In addition, the template document 101 includes a graphical object 700. FIG. 7 is an illustrative example of where the template document 101 is an invoice document.

In FIG. 7, the user has selected an area of the template document 101 to define the anchor area 300. The anchor area 300 in FIG. 7 includes the graphical object 700 along with various text objects and number objects. The anchor area 300 also includes the field zone 302. In this example, the template document 101 and the reference document 102 are unlikely to have all the objects in the respective anchor areas 300 being similar because some of the objects, such as the number objects (e.g., the subtotal of $200.00) will likely be different on each of the reference documents 102. Since the number objects are not common, the uncommon objects will be sorted out when the common objects in the reference document 102 are determined.

In FIG. 7, the text objects along with the graphical object 700 can be identified and used in the same manner as described above. For example, the graphical object 700 will be compared between the template document 101 and the reference document 102 to determine if it is the same graphical object. The graphical object can be compared based on the size of the graphical object 700, based on objects within the graphical object 700, and/or the like. In this example, the first distance can be a distance from the graphical object 700 to the text object "Subtotal." If the graphical object 700 in the template document 101 anchor area 300 is substantially the same as the graphical object 700 in the reference document 102 (along with the common text objects and their distances) the process will then be able to retrieve the corresponding field zone 312 in the reference document 102. In this example, the graphical object 700 can use similar types of orientation points as described above.

In the example in FIG. 7, the user has selected a greater number of objects that will be common between the anchor area 300 in the template document 101 and the reference document 102. The greater number of objects that are selected in the anchor area 300 will increase the likelihood that the system will be able to retrieve the corresponding target object from the corresponding field zone 312. Alternatively, if the anchor area 300 only contains two objects, the likelihood of making a match (especially if one or both of the objects has been scanned incorrectly) is less likely.

The number of objects that are required to match can vary based on implementation. For example, a user can define a percentage of common objects in the anchor area that must match. Alternatively, the user can define a specific number of objects that need to match.

In FIG. 7, the field zone 302 is inside the anchor area 300. In this example, the distance 701 between the anchor area 300 and the field zone 302 is from lower right hand corner of the anchor area 300 to the lower left hand corner of the field zone 302. However, as discussed above, any orientation point can be used.

If relative angles were also used, the relative angle 702 from the anchor area 300 to the field zone 302 can be based on the angle 702 from the field zone 302 to the anchor point (as shown in FIG. 7) and/or can be based on an angle 703 from the anchor area 300 to the field zone 302.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
  receiving a scanned template document;
  receiving an input from a user that identifies an anchor area in the scanned template document, wherein the anchor area comprises a first plurality of objects and wherein the anchor area is a subset of the scanned template document;
  identifying the first plurality of objects in the anchor area;
  identifying locations of the first plurality of objects in the anchor area;
  identifying one or more distances between the locations of the plurality of objects in the anchor area;
  receiving, based on an input from the user, a user defined field zone in the scanned template document, wherein the user defined field zone comprises a target object and wherein the user defined field zone in the scanned template document is used to identify and capture a corresponding target object in the a scanned reference document;
  identifying a distance between the anchor area and the user defined field zone;
  receiving a scanned reference document, wherein the scanned reference document comprises a second plurality of objects;
  identifying the second plurality of objects in the scanned reference document;
  determining that at least a number of the first plurality of objects are common to the second plurality of objects;
  in response to at least a number of the first plurality of objects being common to the second plurality of objects, identifying locations of common objects in the second plurality of objects;
  identifying one or more distances between the locations of the plurality of common objects in the second plurality of objects;
  determining that the one or more distances between the locations of the first plurality of objects are the same as the one or more distances between the locations of the plurality of common objects in the second plurality of objects; and
  in response to determining that the one or more distances between the locations of the first plurality of objects are the same as the one or more distances between the locations of the plurality of common objects in the second plurality of objects, identifying and retrieving the corresponding target object in the scanned reference document based on the distance between the anchor area and the user defined field zone in the scanned template document, wherein the retrieved corresponding target object is related to the target object.

2. The method of claim 1, further comprising the steps of:
  identifying one or more relative angles between the first plurality of objects, wherein the one or more relative angles between the first plurality of objects are based on an orientation of respective objects in the scanned template document;
  identifying one or more relative angles between the plurality of common objects in the scanned reference document, wherein the one or more relative angles between the plurality of common objects in the scanned reference document are based on an orientation of respective objects in the scanned reference document; and
  wherein identifying and retrieving the corresponding target object in the scanned reference document is also based on determining that the one or more relative angles between the first plurality of objects are the same as the one or more relative angles between the plurality of common objects in the scanned reference document.

3. The method of claim 1, wherein the scanned template document and the scanned reference document are scanned by a document scanner and wherein at least one of the scanned template document and the scanned reference document are misaligned, upside down, or scanned using a different resolution.

4. The method of claim 1, wherein the first plurality of objects in the anchor area comprise text objects that are words, wherein one or more of the text objects that are words are partially in the anchor area and wherein the one or more text objects that are words that are partially in the anchor area are included in the first plurality of objects.

5. The method of claim 1, wherein the anchor area is defined based on one or more of: a square, a rectangle, a circle, an oval, a user drawn area, and a triangle.

6. The method of claim 1, wherein the first plurality of objects comprises one or more of a text object, a text character, a phrase, an image, and a logo.

7. The method of claim 1, wherein receiving the user defined field zone in the scanned template document comprises receiving, based on user input, a plurality of user defined field zones in the scanned template document, wherein identifying the distance between the anchor area and the user defined field zone comprises identifying a plurality of distances between the anchor area and the plurality of user defined field zones, and wherein identifying and retrieving the corresponding target object in the scanned reference document based on the distance between the anchor area and the user defined field zone in the scanned template document is based on the plurality of distances between the anchor area and the plurality of user defined field zones.

8. The method of claim 1, wherein the target object and the corresponding target object comprise a plurality of objects.

9. The method of claim 1, wherein the second plurality of objects comprises a common object that is outside a corresponding anchor area in the scanned reference document and wherein the common object that is outside the corresponding anchor area in the scanned reference document is determined to be outside the corresponding anchor area in the scanned reference document based on the identified one or more distances between the locations of the plurality of objects in the anchor area.

10. The method of claim 1, wherein the user defined field zone is defined within the anchor area.

11. A system comprising:
a microprocessor; and
a computer readable medium, coupled with the microprocessor and comprising microprocessor readable and executable instructions that cause the microprocessor to execute:
a document processor that receives a scanned template document, receives an input from a user that identifies an anchor area in the scanned template document, wherein the anchor area comprises a first plurality of objects and wherein the anchor area is a subset of the scanned template document, identifies the first plurality of objects in the anchor area, identifies locations of the first plurality of objects in the anchor area, identifies one or more distances between the locations of the plurality of objects in the anchor area, receives, based on an input from the user, a user defined field zone in the scanned template document, wherein the user defined field zone comprises a target object and wherein the user defined field zone in the scanned template document is used to identify and capture a corresponding target object in the a scanned reference document, identifies a distance between the anchor area and the user defined field zone, receives a scanned reference document, wherein the scanned reference document comprises a second plurality of objects, identifies the second plurality of objects in the scanned reference document, determines that at least a number of the first plurality of objects are common to the second plurality of objects, identifies locations of common objects in the second plurality of objects in response to at least a number of the first plurality of objects being common to the second plurality of objects, identifies one or more distances between the locations of the plurality of common objects in the second plurality of objects, determines that the one or more distances between the locations of the first plurality of objects are the same as the one or more distances between the locations of the plurality of common objects in the second plurality of objects; and
an object retriever that identifies and retrieves the corresponding target object in the scanned reference document based on the distance between the anchor area and the user defined field zone in the scanned template document in response to determining that the one or more distances between the locations of the first plurality of objects are the same as the one or more distances between the locations of the plurality of common objects in the second plurality of objects, wherein the retrieved corresponding target object is related to the target object.

12. The system of claim 11, wherein:
the document processor is further configured to identify one or more relative angles between the first plurality of objects, wherein the one or more relative angles between the first plurality of objects are based on an orientation of respective objects in the scanned template document and identify one or more relative angles between the plurality of common objects in the scanned reference document, wherein the one or more relative angles between the plurality of common objects in the scanned reference document are based on an orientation of respective objects in the scanned reference document; and
the object retriever is further configured to identify and retrieve the corresponding target object in the scanned reference document also based on determining that the one or more relative angles between the first plurality of objects are the same as the one or more relative angles between the plurality of common objects in the scanned reference document.

13. The system of claim 11, wherein the scanned template document and the scanned reference document are scanned by a document scanner and wherein at least one of the scanned template document and the scanned reference document are misaligned, upside down, or scanned using a different resolution.

14. The system of claim 11, wherein the first plurality of objects in the anchor area comprise text objects that are words, wherein one or more of the text objects that are words are partially in the anchor area and wherein the one or more text objects that are words that are partially in the anchor area are included in the first plurality of objects.

15. The system of claim 11, wherein the first plurality of objects comprises one or more of a text object, a text character, a phrase, an image, and a logo.

16. The system of claim 11, wherein receiving the user defined field zone in the scanned template document comprises receiving, based on user input, a plurality of user defined field zones in the scanned template document, wherein identifying the distance between the anchor area and the user defined field zone comprises identifying a plurality of distances between the anchor area and the plurality of user defined field zones, and wherein identifying and retrieving the corresponding target object in the scanned reference document based on the distance between the anchor area and the user defined field zone in the scanned template document is based on the plurality of distances between the anchor area and the plurality of user defined field zones.

17. The system of claim 11, wherein the target object and the corresponding target object comprise a plurality of objects.

18. The system of claim 11, wherein the second plurality of objects comprises a common object that is outside a corresponding anchor area in the scanned reference document and wherein the common object that is outside the corresponding anchor area in the scanned reference document is determined to be outside the corresponding anchor area in the scanned reference document based on the identified one or more distances between the locations of the plurality of objects in the anchor area.

19. The system of claim 11, wherein the user defined field zone is defined within the anchor area.

20. A system comprising:

a microprocessor; and a computer readable medium, coupled with the microprocessor and comprising microprocessor readable and executable instructions that cause the microprocessor to execute:

a document processor that receives a scanned template document, receives an input from a user that identifies an anchor area in the scanned template document, wherein the anchor area comprises a first plurality of objects and wherein the anchor area is a subset of the scanned template document, identifies the first plurality of objects in the anchor area, identifies locations of the first plurality of objects in the anchor area, identifies one or more distances between the locations of the plurality of objects in the anchor area, receives, based on an input from a user, a user defined field zone in the scanned template document, wherein the user defined field zone comprises a target object and wherein the user defined field zone in the scanned template document is used to capture and identify a corresponding target object in the a scanned reference document, identifies a distance between the anchor area and the user defined field zone, receives a scanned reference document, wherein the scanned reference document comprises a second plurality of objects, identify the second plurality of objects in the scanned reference document, determines that at least a number of the first plurality of objects are common to the second plurality of objects, identifies locations of common objects in the second plurality of objects in response to at least a number of the first plurality of objects being common to the second plurality of objects, identifies one or more distances between the locations of the plurality of common objects in the second plurality of objects, determines that the one or more distances between the locations of the first plurality of objects are the same as the one or more distances between the locations of the plurality of common objects in the second plurality of objects, identifies one or more relative angles between the first plurality of objects, wherein the one or more relative angles between the first plurality of objects are based on an orientation of respective objects in the scanned template document and identifies one or more relative angles between the plurality of common objects in the scanned reference document, wherein the one or more relative angles between the plurality of common objects in the scanned reference document are based on an orientation of respective objects in the scanned reference document; and an object retriever that identifies and retrieves the corresponding target object in the scanned reference document based on the distance between the anchor area and the user defined field zone in the scanned template document and based on determining that the one or more relative angles between the first plurality of objects are the same as the one or more relative angles between the plurality of common objects in the scanned reference document in response to determining that the one or more distances between the locations of the first plurality of objects are the same for the one or more distances between the locations of the plurality of common objects in the second plurality of objects, wherein the retrieved corresponding target object is related to the target object.

* * * * *